(12) United States Patent
Norman et al.

(10) Patent No.: US 6,478,236 B1
(45) Date of Patent: Nov. 12, 2002

(54) AGRICULTURAL SPRAYER

(75) Inventors: Thomas Norman, Greve (DK); Jørgen Bo Mørch Secher, Birkerød (DK)

(73) Assignee: Hardi International A/S, Taastrup (DK)

( * ) Notice: Subject to any disclaimer, the term of this patent is extended or adjusted under 35 U.S.C. 154(b) by 0 days.

(21) Appl. No.: 09/628,030

(22) Filed: Jul. 28, 2000

Related U.S. Application Data

(63) Continuation-in-part of application No. 09/330,093, filed on Jun. 11, 1999, now abandoned.

(51) Int. Cl.$^7$ .................................................. B05B 1/20
(52) U.S. Cl. ..................... 239/159; 239/112; 239/127; 239/310
(58) Field of Search .............................. 239/159, 112, 239/113, 119, 124, 127, 157, 310

(56) References Cited

U.S. PATENT DOCUMENTS

| | | |
|---|---|---|
| 4,121,767 A | 10/1978 | Jensen |
| 4,196,852 A | 4/1980 | Thomas, III |
| 4,274,585 A | 6/1981 | Lestradet |
| 4,380,308 A | 4/1983 | Greenwood |
| 4,534,802 A | 8/1985 | Gates et al. |
| 4,714,196 A | 12/1987 | McEarchern et al. |
| 4,838,489 A * | 6/1989 | Van Steijn .................. 239/113 |
| 5,014,914 A | 5/1991 | Wallenas |
| 5,125,576 A | 6/1992 | Ziergenbien |
| 5,433,380 A | 7/1995 | Hahn |
| 5,692,679 A * | 12/1997 | Marran et al. ............... 239/127 |

FOREIGN PATENT DOCUMENTS

| | | |
|---|---|---|
| DE | WO 96/36223 | 11/1996 |
| EP | 0 086 031 | 8/1983 |
| EP | 0 304 102 | 2/1989 |
| EP | 0 734 203 | 10/1996 |

* cited by examiner

*Primary Examiner*—Lesley D. Morris
*Assistant Examiner*—Dinh Q. Nguyen
(74) *Attorney, Agent, or Firm*—Finnegan, Henderson, Farabow, Garrett, & Dunner, L.L.P.

(57) ABSTRACT

An agricultural sprayer for spraying a mixture of a carrier liquid and at least one active ingredient, and including a carrier liquid container, at least one active ingredient container for containing the active ingredient in concentrated form, a mixing chamber for mixing the carrier liquid with the active ingredient, at least one active ingredient feed line between the at least one active ingredient container and the mixing chamber and a carrier liquid feed line between the carrier liquid container and the mixing chamber, a boom structure having at least one nozzle connected with said mixing chamber for spraying the mixture of the active ingredient and the carrier liquid, and means for generating and discharging a flow of gas under pressure. The sprayer has connecting means that allow gas low communication between said means for generating and discharging a flow of gas under pressure and said at least one container for receiving an active ingredient. The connecting means are located such that a gas flow generated by said means for generating and discharging a flow of gas under pressure sets up a flow of said active ingredient present in said active ingredient feed line in a direction from said mixing chamber toward at least one of said active ingredient containers.

25 Claims, 4 Drawing Sheets

AGRICULTURAL SPRAYER

A CROSS-REFERENCE TO RELATED APPLICATION

This is a continuation of U.S. application Ser. No. 09/330,093, filed Jun. 11, 1999 now abandoned.

BACKGROUND OF THE INVENTION

The present invention relates to an agricultural sprayer for spraying a carrier liquid, such as water, mixed with at least one active ingredient and including a container for the carrier liquid, at least one container for an active ingredient, such as a fertilizer, an insect or disease controlling ingredient or a weed killing ingredient, in concentrated form, a mixing chamber for mixing the carrier liquid for feeding the active ingredient to the mixing chamber and for deeding the carrier liquid to the mixing chamber, a boom structure having at least one nozzle connected with the mixing chamber for spraying the active ingredient mixed with the carrier liquid, and means for generating and discharging a flow of gas under pressure, preferably air.

DESCRIPTION OF THE RELATED ART

Such agricultural sprayers are generally known from the disclosure of EP 86 031, for example, and are used as a modern alternative to conventional agricultural sprayers where the active ingredient is mixed with the carrier liquid prior to the sprayer being advanced over the field.

The use of this new type of agricultural sprayer often involves, however, a significant loss of expensive active ingredient when the lines that connect the active ingredient containers with the nozzles, are emptied after the termination of the spraying operation for allowing subsequent spraying of a different active ingredient. This problem is particularly pronounced where the mixing-chamber, in which the active ingredient is mixed with the carrier liquid, is arranged at a relatively great distance from the active ingredient container. The active ingredient emptied from the lines is at times merely led to the sewer, leading to severe environmental problems.

SUMMARY OF THE INVENTION

The invention provides simple means whereby the above loss of active ingredient may be prevented, allowing ia. reduction of the costs involved in the spraying operation.

In accordance with the invention connecting means is provided that allow gas flow communication between the means for generating and discharging a flow of gas under pressure and the active ingredient container, the connecting means being located such that discharged gas under pressure sets up a flow of active ingredient which has not been mixed with the carrier liquid and which is present in the line connecting the mixing chamber with the active ingredient container, in a direction from the mixing chamber toward the active ingredient container.

The connecting means may include a valve, such as a one-way valve. The use of a suitable valve arranged at the mixing chamber may permit a sealing-off or the mixing chamber when pressurized gas is discharged and active ingredient is led back to the container. The pressurized gas may also be used for simultaneous or subsequent discharge of any liquid present in the mixing chamber through the nozzles.

The means for generating and discharging a flow of gas under pressure may preferably be a compressed air container or, alternatively, an air blower, whereby the invention may be implemented to particular advantage in connection with so-called air-assisted agricultural sprayers (see, for example, EP 734 203), where the air-flow from the blower may thus be utilized for the mentioned purpose after the termination of the spraying operation.

The lines for feeding the active ingredient to the mixing chamber may also be connected with a container for a cleaning or rinsing liquid, such as the container for carrier liquid, to allow flushing thereof after the active ingredient has been driven back to the active ingredient container.

Further, the mixing chamber may be positioned close to the nozzles on the boom structure, so that a prescribed change of the metered amount of active ingredient per unit of time and thereby of the concentration of active ingredient in the mixture is registered in the spray discharged from the nozzles immediately after the change has been made. The invention provides quite special advantages in this case, since a degree of freedom is achieved as regards the positioning of the active ingredient containers, without involving an unnecessary loss of active ingredient after the termination of a spraying operation. It will be appreciated that in this situation the active ingredient containers may be positioned close to the carrier liquid container, thereby allowing the operator-operated parts of the agricultural sprayer to be gathered at one place.

Means may also be provided for equalising the pressure in the container for active ingredient. The provision of such means is, however, no prerequisite for the proper operation of the invention, particularly when collapsible containers for the active ingredient are used.

Alternatively, the means may be adapted to generate a negative pressure in the container for active ingredient, thereby drawing back active agent present in the hose leading to the mixing chamber. In this case, too, means for providing a pressure equalisation may be provided.

It will be appreciated that the invention may find application in connection with agricultural sprayers having one or more containers for different active ingredients, including e.g. where each of these are connected with the same or different mixing chambers by means of hoses, which may thereby be emptied after the termination of a spraying operation. Such an agricultural sprayer may e.g. conceivably be used for spraying during the same operation of an area where e.g. a fungicide is needed in one area, while an insecticide is needed in an adjoining area.

BRIEF DESCRIPTION OF THE DRAWINGS

The invention will be explained more fully below with reference to the embodiments shown in the drawing, in which.

DESCRIPTION OF THE PREFERRED EMBODIMENT

Figure 1:
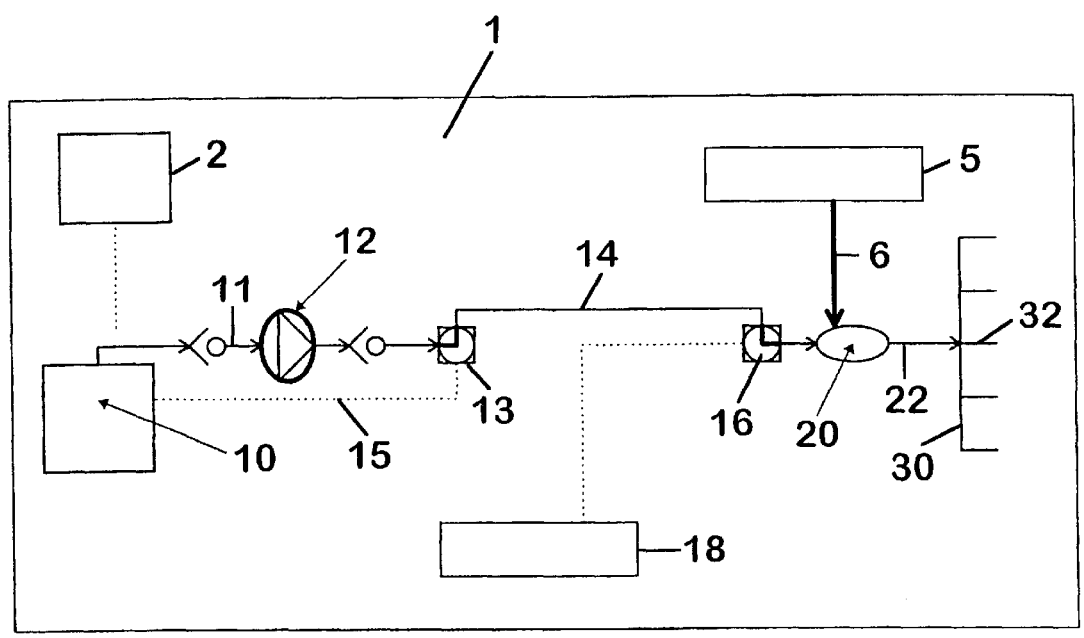
FIG. 1 shows the agricultural sprayer during a spraying operation.

FIG. 1 shows a section of an agricultural sprayer, more particularly a liquid feeding system, which stay be positioned either on a self-propelled unit, a trailer coupled to a tractor, or on a frame intended to be mounted on a tractor, The liquid feeding system comprises a container 5 for a carrier liquid, typically water. The container 5 may have a volume of about 0.5–6 m$^3$, for example. A hose connection 6 extends from the container 5 to a mixing chamber 20 in which the carrier liquid is mixed with a highly concentrated liquid active ingredient, such as a fungicide or pesticide. The resultant mixture is fed via a hose connection 22 to a plurality of nozzles 32 arranged on a boom 30. Alternatively, the mixing chamber 20 may form an integrated part of each nozzle, which thus receives both carrier liquid and active ingredient via separate connecting hoses.

As shown, the agricultural sprayer also comprises a container 10 for the mentioned active ingredient. The container 10 is connected with the mixing chamber 20 via a relatively short connecting hose 11, a longer connecting hose 14, a metering pump 12 and shut-off valves 13 and 16 for feeding active ingredient for mixing with the carrier liquid. Instead of using a metering pump 12 the feeding of the active ingredient to the mixing chamber 20 may take place by providing a negative pressure in the mixing chamber 20, e.g. by a venturi effect.

Figure 2:
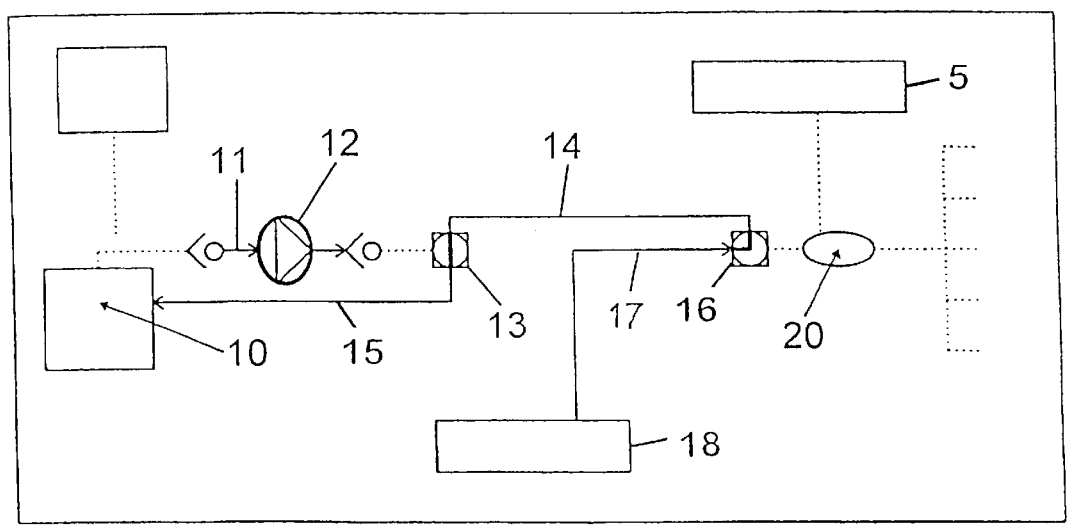
FIG. 2 shows the agricultural sprayer during return flow of unused active ingredient in the hoses.

FIG. 2 shows a state of the agricultural sprayer after the termination or a spraying operation, where the metering pump 12 and a pump (not shown) carrying carrier liquid to the mixing chamber 20 are stopped. In this state, an amount of active ingredient that has not reached the mixing chamber is left in the connecting hose 14, which hose 14 may have a length in the range of about 1–15 meters, the particular length depending on the structure of the agricultural sprayer. Tt will be appreciated that even with a modest hose cross-section a considerable amount of active ingredient will be left in the hose 14. To avoid waste of this amount of active ingredient, the agricultural sprayer comprises a compressor or blower 18 connected with the container 10 via a hose connection 17, via the valve 16, the hose 14 and via an additional length of hose 15, which extends between the shut-off valve 13 and the container 10. Air under pressure, which is generated by the compressor or blower 18, is then used for passing or pressing the active ingredient in the hose 14 back to the container 10, as the valve 16, which may be a three-way valve, is switched so as to block access to the mixing chamber 20, and so as to place the blower 18 in flow communication with the hose 14. The valve 13 is preferably switched so that the hose 11 is isolated from the home 14. The container 10 may be of the collapsible or may have a venting opening to provide prescribed pressure equalization. When the active ingredient in the hose 14 has been fed back to the container 10, an outlet valve (not shown) at the container 10 is shut-off. In this embodiment the hose connection 17 is arranged relatively close to the mixing chamber 20 to allow for a backflow of essentially all active ingredient present in hose 14. Other arrangements may be envisaged.

Figure 3:
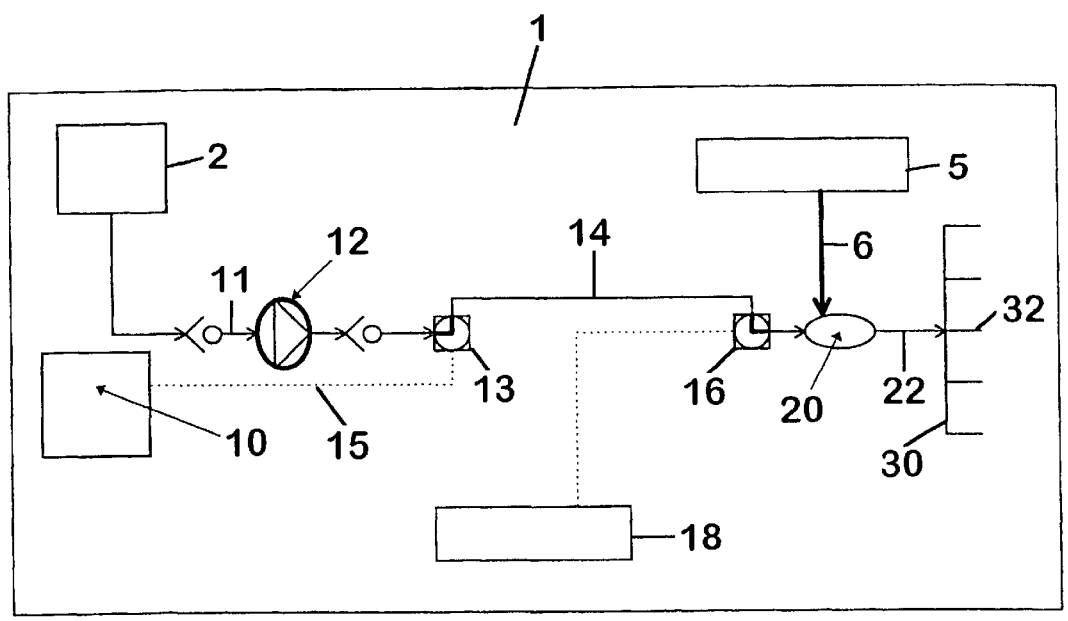
FIG. 3 shows the agricultural sprayer after return flow of the unused active ingredient during cleaning of the hoses.

FIG. 3 shows the agricultural sprayer in a cleaning state where the hose 11 is connected with a container 2 for a cleaning liquid via a valve (not shown) . Alternatively, the hose 11 may be connected with the container 5, if this contains water or a similar liquid suitable for cleaning the hoses 11, 14, 22. By performing a suitable switching of the valves 13 and 16 simultaneously it is possible to carry out cleaning of the hoses 11, 14, 22, which may be flushed by the cleaning liquid using the pump 12. It will be appreciated that solely cleaning of the hoses is performed in this situation, as the liquid from the container 2 does not drive active ingredient out through the nozzles. It may be mentioned that the valve 16 may also be arranged to place the blower 18 in flow communication with the mixing chamber 20 when the active ingredient has been fed back to the container 10, to allow of emptying of the liquid present in the hose 22 via the nozzles 32.

Figure 4:
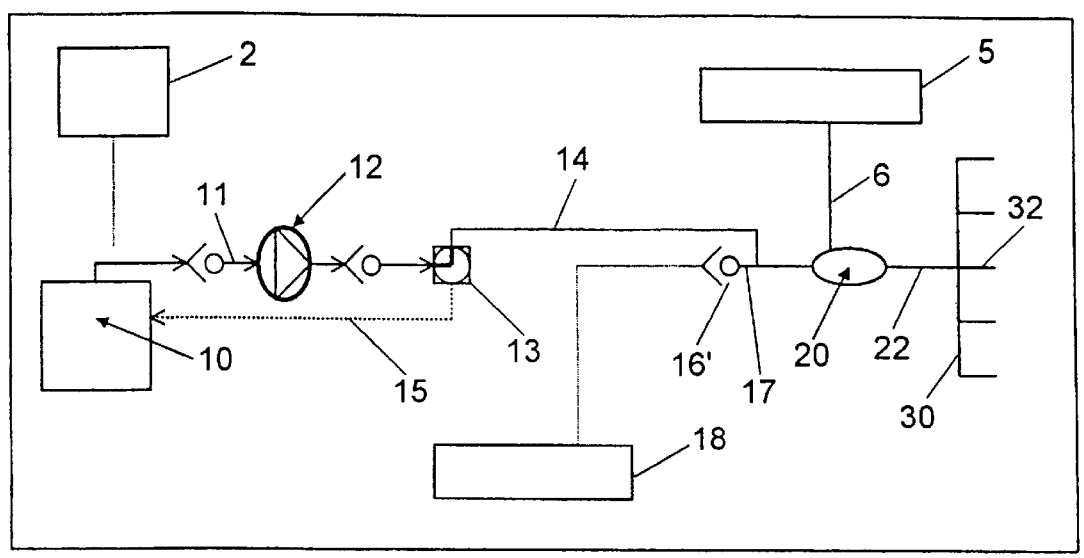
FIG. 4 shows an alternative embodiment of the invention, during a spraying operation.

FIG. 4 shows an alternative embodiment of the invention in which the valve 16 is replaced by a one-way valve 16', which prevents loss of liquid from the hose 14. The oneway valve 16' is arranged in a stub 17 forming a branch of the hose 14. The stub 17 connects to the compressor or blower 18 and the one-way valve 16' is adapted to open when pressurized air leaves the compressor or blower 18 whereby pressurized air enters the hose 14 to drive active agent in the hose 14 towards the container 10. Part of the flow of pressurized air entering the hose 14 may be directed to the mixing chamber 20 to discharge any active agent mixed with carrier liquid present therein and in the hose connection 22. A valve (not shown) may suitably be arranged in the hose connection 6 to disconnect the container 5 for the carrier liquid. It is noted that the blower 18 may—in accordance with the invention —also be connected directly to the mixing chamber 20 or at any other location suitable for achieving the overall object of the invention.

What is claimed is:

1. An agricultural sprayer for spraying a mixture of a carrier liquid and at least one active ingredient, comprising:
   a carrier liquid container,
   at least one active ingredient container for containing the active ingredient in concentrated form,
   a mixing chamber for mixing the carrier liquid with the active ingredient,
   at least one active ingredient feed line between the at least one active ingredient container and the mixing chamber and a carrier liquid feed line between the carrier liquid container and the mixing chamber,
   a boom structure having at least one nozzle connected with said mixing chamber for spraying the mixture of the active ingredient and the carrier liquid,
   means for generating and discharging a flow of gas under pressure, and
   connecting means allowing gas flow communication between said means for generating and discharging a flow of gas under pressure and said at least one container for receiving an active ingredient,
   said connecting means being located such that a gas flow generated by said means for generating and discharging a flow of gas under pressure sets up a flow of said active ingredient present in said active ingredient feed line in a direction from said mixing chamber toward said at least one active ingredient container.

2. An agricultural sprayer according to claim 1, wherein said connecting means comprises a one-way valve.

3. An agricultural sprayer according to claim 1 wherein the active ingredient feed lines comprise a valve arranged between said connecting means and said mixing chamber.

4. An agricultural sprayer according to claim 1 wherein the connecting means is arranged adjacent to said mixing chamber.

5. An agricultural sprayer according to claim 1 wherein said means for providing the flow of gas comprise one of a blower, a compressor or a compressed gas container.

6. An agricultural sprayer according to claim 1 wherein the active ingredient feed lines comprise a pump for feeding active ingredient to the mixing chamber.

7. An agricultural sprayer according to claim 1 wherein the mixing chamber comprises means for providing a negative pressure in the active ingredient feed lines.

8. An agricultural sprayer according to claim 1 wherein the active ingredient feed lines are also connected with a container for a cleaning liquid.

9. An agricultural sprayer according to claim 1 wherein the mixing chamber is arranged on the boom structure, and the at least one active ingredient container is arranged in the vicinity of the carrier liquid container.

10. An agricultural sprayer according to claim 1 wherein the mixing of active ingredient and carrier liquid takes place immediately in front of each nozzle.

11. An agricultural sprayer according to claim 1 wherein each nozzle is constructively built together with a respective mixing chamber.

12. An agricultural sprayer according to claim 1 wherein the at least one active ingredient container is provided with venting means.

13. A method of operating the agricultural sprayer of claim 1, after the termination of a spraying operation, including the steps of:

shutting off the at least one active ingredient feed line adjacent to the mixing chamber, and back feeding active ingredient in the at least one active ingredient feed line to the active ingredient container using compressed air.

14. The method of claim 13, wherein the carrier liquid is water.

15. The method of claim 13, wherein the active ingredient is fertilizer.

16. The method of claim 13, wherein the active ingredient is a disease controlling agent.

17. The method of claim 13, wherein the active ingredient is a weed killing agent.

18. An agricultural sprayer according to claim 1, wherein said connecting means includes a valve adjacent to the mixing chamber in the at least one active ingredient feed line, the valve being adjustable between a first position to provide flow communication with said mixing chamber, and a second position to prevent flow communication with said mixing chamber, and said means for generating and discharging a flow of gas under pressure is connected with the at least one active ingredient feed line adjacent to the mixing chamber for providing a flow of active ingredient in a direction from said mixing chamber when the valve is adjusted to the second position.

19. An agricultural sprayer according to claim 18, herein the means for generating and discharging a flow of gas under pressure comprises one of a blower, a compressor or a compressed gas container, and wherein the valve is a three-way valve adapted to provide flow communication between the means for generating and discharging a flow of gas under pressure and the at least one active ingredient feed line when the valve is adjusted to the second position.

20. An agricultural sprayer according to anyone of claim 18 or 19 including a pump for feeding active ingredient to the mixing chamber.

21. An agricultural sprayer according to claim 18, wherein the mixing chamber comprises means for providing a negative pressure in the at least one active ingredient feed line for feeding the active ingredient to the mixing chamber.

22. An agricultural sprayer according to claim 18, wherein the at least one active ingredient feed line is also connected with a container for cleaning liquid adjacent to the active ingredient container.

23. An agricultural sprayer according to claim 18, wherein the mixing chamber is arranged on the boom structure, and the at least one active ingredient container is arranged in the immediate vicinity of the carrier liquid container.

24. An agricultural sprayer according to claim 18, wherein the mixing chamber is located immediately before the at least one nozzle.

25. An agricultural sprayer according to claim 18, wherein the at least one nozzle is integrated with the mixing chamber.

* * * * *

UNITED STATES PATENT AND TRADEMARK OFFICE
CERTIFICATE OF CORRECTION

PATENT NO. : 6,478,236 B1  
DATED : November 12, 2002  
INVENTOR(S) : Thomas Norman et al.

It is certified that error appears in the above-identified patent and that said Letters Patent is hereby corrected as shown below:

Title page,
Item [57], ABSTRACT,
Line 14, "low" should read -- flow --.

Column 5,
Line 17, "the agricultural" should read -- an agricultural --.

Column 6,
Line 8, "herein" should read -- wherein --.
Line 16, "claim" should read -- claims --.

Signed and Sealed this

Sixteenth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,478,236 B1                                              Page 1 of 1
DATED         : November 12, 2002
INVENTOR(S)   : Thomas Norman et al.

It is certified that error appears in the above-identified patent and that said Letters Patent is hereby corrected as shown below:

<u>Column 5,</u>
Line 18, "claim 1," should read -- either one of claims 1 or 18, --.

Signed and Sealed this

Fourth Day of November, 2003

JAMES E. ROGAN
*Director of the United States Patent and Trademark Office*